(12) United States Patent
Shi et al.

(10) Patent No.: US 12,335,701 B2
(45) Date of Patent: Jun. 17, 2025

(54) HEAD-MOUNTED DEVICE AND CONTROL METHOD, APPARATUS AND SYSTEM

(71) Applicant: GOERTEK INC., Shandong (CN)

(72) Inventors: Xiyu Shi, Shandong (CN); Bin Jiang, Shandong (CN); Xiaoyu Chi, Shandong (CN)

(73) Assignee: GOERTEK INC., Shandong (CN)

( * ) Notice: Subject to any disclaimer, the term of this patent is extended or adjusted under 35 U.S.C. 154(b) by 262 days.

(21) Appl. No.: 18/248,494

(22) PCT Filed: Sep. 30, 2021

(86) PCT No.: PCT/CN2021/121987
§ 371 (c)(1),
(2) Date: Apr. 10, 2023

(87) PCT Pub. No.: WO2022/078226
PCT Pub. Date: Apr. 21, 2022

(65) Prior Publication Data
US 2023/0362544 A1 Nov. 9, 2023

(30) Foreign Application Priority Data
Oct. 14, 2020 (CN) .......................... 202011093469.6

(51) Int. Cl.
*H04R 1/02* (2006.01)
*H04R 3/12* (2006.01)

(52) U.S. Cl.
CPC ............... *H04R 3/12* (2013.01); *H04R 1/028* (2013.01); *H04R 2460/01* (2013.01); *H04R 2460/13* (2013.01)

(58) Field of Classification Search
CPC ...... H04R 3/12; H04R 1/028; H04R 2460/01; H04R 2460/13
See application file for complete search history.

(56) References Cited

U.S. PATENT DOCUMENTS

| | | | | |
|---|---|---|---|---|
| 9,788,097 | B2* | 10/2017 | Bullen | G06F 3/162 |
| 2011/0301729 | A1* | 12/2011 | Heiman | H04S 7/301 |
| | | | | 381/74 |
| 2012/0105740 | A1* | 5/2012 | Jannard | G02B 27/017 |
| | | | | 351/158 |
| 2016/0286299 | A1* | 9/2016 | Anderson | H04R 1/1016 |
| 2018/0279710 | A1* | 10/2018 | Rong | A42B 3/30 |

(Continued)

FOREIGN PATENT DOCUMENTS

| | | |
|---|---|---|
| CN | 201733343 U | 2/2011 |
| CN | 103941426 A | 7/2014 |
| CN | 206020848 U | 3/2017 |

(Continued)

*Primary Examiner* — Jason R Kurr
(74) *Attorney, Agent, or Firm* — LKGlobal | Lorenz & Kopf, LLP (57) ABSTRACT

A head-mounted device and a control method, apparatus and system are disclosed. The head-mounted device comprises a device body, a bracket connected with the device body, and at least one rotary arm. The bracket is used to wear the head-mounted device on a user's head. The bracket is provided thereon with a bone conduction speaker. One end of the rotary arm is rotationally connected to the bracket, and the other end of the rotary arm is provided with an earphone.

7 Claims, 3 Drawing Sheets

(56) References Cited

U.S. PATENT DOCUMENTS

2019/0349662 A1 11/2019 Lindahl

FOREIGN PATENT DOCUMENTS

| CN | 106686495 A | 5/2017 |
|---|---|---|
| CN | 108024187 A | 5/2018 |
| CN | 209821540 U | 12/2019 |
| CN | 111935600 A | 11/2020 |
| GB | 757590 A | 9/1956 |
| WO | 2020003069 A1 | 1/2020 |

* cited by examiner

HEAD-MOUNTED DEVICE AND CONTROL METHOD, APPARATUS AND SYSTEM

CROSS-REFERENCE TO RELATED APPLICATIONS

This application is a U.S. National-Stage entry under 35 U.S.C. § 371 based on International Application No. PCT/CN2021/121987, filed Sep. 30, 2021 which was published under PCT Article 21(2) and which claims priority to Chinese Application No. 202011093469.6, filed Oct. 14, 2020, which are all hereby incorporated herein in their entirety by reference.

TECHNICAL FIELD

This application pertains to the technical field of equipment control. More specifically, the present disclosure relates to a head-mounted device, a control method of a head-mounted device, a control apparatus of a head-mounted device and a control system of a head-mounted device.

BACKGROUND

Augmented Reality (AR) technology is a technology that skillfully integrates virtual information with the real world. It uses various technical means such as multimedia, 3D modeling, real-time tracking and registration, intelligent interaction and sensing to simulate virtual information such as computer-generated text, images, 3D models, music and video, and then applies them to the real world. The two kinds of information complement each other, thereby realizing the "enhancement" of the real world.

With the rise of intelligent wearable devices and the advent of the mobile era, AR devices enter into people's lives, and they can be worn at all time and in various scenarios. However, in different application scenarios, users may have different requirements for playing audio on AR devices. For example, when users wear AR devices on the street, they need to be able to clearly hear the audio output by the AR devices, and also be able to accurately perceive the ambient sound, so as to avoid dangerous situations. For another example, when users wear AR devices in an environment such as on the subway or bus, AR devices need to be able to block out external interference noise, output high-fidelity audio to users, and bring immersive experience. In addition, other objects, desirable features and characteristics will become apparent from the subsequent summary and detailed description, and the appended claims, taken in conjunction with the accompanying drawings and this background.

SUMMARY

An object of the present disclosure is to provide anew technical solution that can solve at least one of the above problems.

According to a first aspect of the present disclosure, a head-mounted device is provided, which comprises: a device body, a bracket connected with the device body, and at least one rotary arm; the bracket is used to wear the head-mounted device on a user's head; the bracket is provided thereon with a bone conduction speaker; one end of the rotary arm is rotationally connected to the bracket, and the other end of the rotary arm is provided with an earphone.

Optionally, the bracket is also provided thereon with a driving component configured to drive the rotary arm to rotate.

Optionally, the head-mounted device further comprises a position detection component, the position detection component is provided on the bracket, and is configured to detect whether the rotary arm is rotated to the position where the position detection component is located.

Optionally, the bracket comprises a hook for hanging on the user's ear. The bone conduction speaker is provided at the end of the hook.

According to a second aspect of the present disclosure, there is provided a control method of a head-mounted device, the head-mounted device is the head-mounted device according to the first aspect of the present disclosure, and the method comprises:
acquiring a noise signal collected by the microphone of the head-mounted device;
determining a target audio mode of the head-mounted device according to the noise signal; and
controlling the head-mounted device to switch from a current audio mode to the target audio mode, and outputting an audio signal according to the target audio mode.

Optionally, the step of determining a target audio mode of the head-mounted device according to the noise signal comprises:
extracting a voice feature of the noise signal as a target voice feature;
comparing the target voice feature with pre-stored reference voice features to determine a reference voice feature matching with the target voice feature; and
taking an audio mode corresponding to the reference voice feature matched with the target voice feature as the target audio mode.

Optionally, the step of controlling the head-mounted device to switch from a current audio mode to the target audio mode, and outputting an audio signal according to the target audio mode comprises:
controlling the rotary arm to rotate to a position where the position detection component is located; and
controlling the head-mounted device to output the audio signal through the bone conduction speaker.

Optionally, the step of controlling the head-mounted device to switch from a current audio mode to the target audio mode, and outputting an audio signal according to the target audio mode comprises:
controlling the rotary arm to rotate from a position where the position detection component is located to a wearing position, so that the earphone is located at a position corresponding to the user's ear; and
controlling the head-mounted device to output the audio signal through the earphone.

Optionally, the step of controlling the head-mounted device to output the audio signal through the earphone comprises:
performing noise reduction processing on the audio signal according to the noise signal; and
controlling the head-mounted device to output the audio signal after noise reduction processed through the earphone.

Optionally, the method further comprises:
in response to a command input by a user to switch to a new audio mode, controlling the head-mounted device to switch from the target audio mode to the new audio mode, and output the audio signal according to the new audio mode.

According to a third aspect of the present disclosure, there is provided a control apparatus of a head-mounted device, wherein the head-mounted device is the head-mounted device according to the first aspect of the present disclosure, and the device comprises:

a noise collection module configured to acquire a noise signal collected by the microphone of the head-mounted device;

a mode determination module configured to determine a target audio mode of the head-mounted device according to the noise signal; and a mode switching module configured to control the head-mounted device to switch from a current audio mode to the target audio mode, and output an audio signal according to the target audio mode.

According to a fourth aspect of the present disclosure, a control system for a head-mounted device is provided, which comprises:

a processor, and a memory configured to store an executable computer program which is configured to control the processor to execute the methods according to the second aspect of the present disclosure.

A beneficial effect of the present disclosure is as follows. The head-mounted device can adaptively switch to the target audio mode matching with the current scenario according to the ambient noise in the current scenario, and play the audio signal according to the target audio mode, which can improve the user experience.

Other features and advantages of the present disclosure will become clearer by reading the following detailed description of the exemplary embodiments of the present disclosure with reference to the accompanying drawings.

BRIEF DESCRIPTION OF DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Now, various embodiments of the present disclosure will be described in detail with reference to the drawings. It should be noted that, unless specified otherwise, the arrangements of the members and steps, mathematical formulas and numerical values described in these embodiments do not restrict the scope of the present disclosure.

The following description of at least one exemplary embodiment is in fact only illustrative, and in no way serves as any restriction on the present disclosure and its application or use.

The techniques, methods and equipment known to a person of ordinary skill in the art may not be discussed in detail. However, when applicable, these techniques, methods and equipment shall be considered as a part of the specification.

In all the examples shown and discussed herein, any specific value should be interpreted as merely illustrative and not as a limitation. Therefore, other examples of the exemplary embodiments may have different values.

It should be noted that similar reference numerals and letters denote similar items in the following drawings. Therefore, once an item is defined in one drawing, it does not need to be further discussed in the subsequent drawings.

<Head-Mounted Device>

Figure 1:
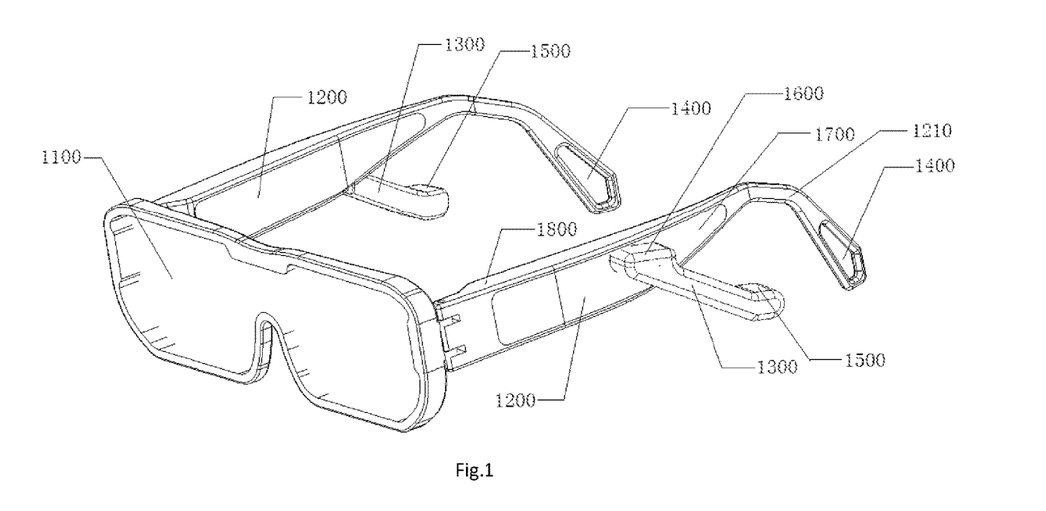
FIG. 1 is a schematic diagram of the structure of a head-mounted device in one of the states according to an embodiment of the present disclosure.
Figure 2:
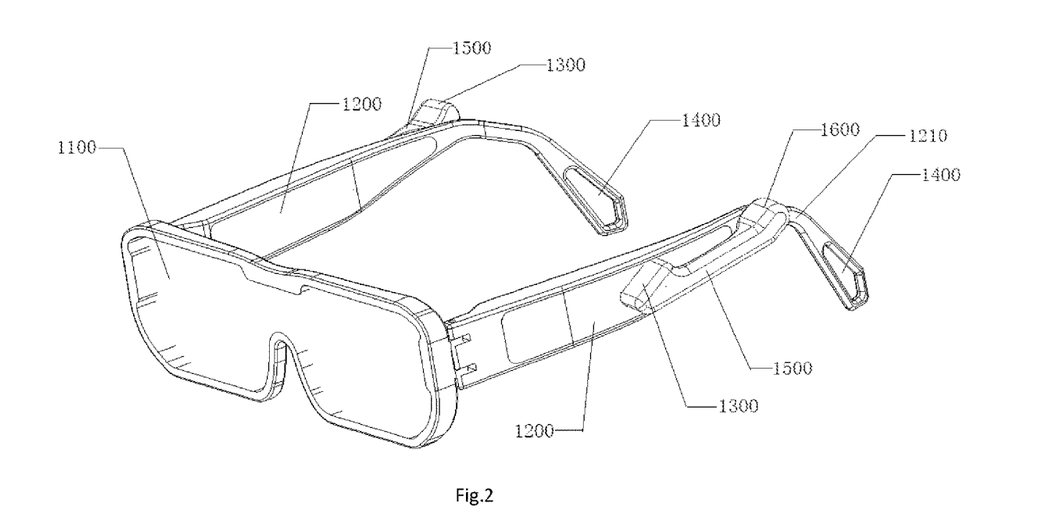
FIG. 2 is a schematic diagram of the structure of a head-mounted device in another state according to an embodiment of the present disclosure.

FIG. 1 and FIG. 2 are schematic diagrams of the structure of a head-mounted device according to an embodiment of the present disclosure. The head-mounted device in this embodiment may be, for example, but is not limited to an augmented reality head-mounted device. Further, the head-mounted device may be AR glasses, for example.

As shown in FIG. 1 and FIG. 2, the head-mounted device may comprise a device body 1100, a bracket 1200 connected to the device body, and at least one rotary arm 1300.

The bracket 1200 may be configured to wear the head-mounted device on the user's head. The bracket 1200 can be equipped with a bone conduction speaker 1400, so that the bone conduction speaker 1400 can fit and attach with the user's skull when the user wears a head-mounted device.

One end of the rotary arm 1300 is rotationally connected to the bracket 1200, and the other end is provided with an earphone 1500. In this way, when the rotary arm 1300 rotates, it can drive the earphone 1500 to change its position.

In an embodiment of the present disclosure, the head-mounted device may comprise two rotary arms 1300, and the earphones 1500 provided on the rotary arms 1300 correspond to the user's left ear and right ear respectively.

The head-mounted device in this embodiment can play audio through the bone conduction speaker 1400 or through the earphone 1500. In the case of playing audio through the earphone 1500, it may be that the rotary arm 1300 is controlled to rotate to the wearing position so that the earphone 1500 is located in the ear of the user wearing the head-mounted device, as shown in FIG. 1. In the case of playing audio through the bone conduction speaker 1400, it may be that the rotary arm 1300 is controlled to rotate to the position where the position detection component 1700 is located, so that the earphone 1500 is far away from the ear of the user who wears the head-mounted device, thereby prevent from causing discomfort to the user who wears the earphone 1500, as shown in FIG. 2.

In an embodiment of the present disclosure, as shown in FIG. 1 and FIG. 2, the bracket 1200 is also provided with a drive component 1600, which is configured to drive the rotary arm 1300 to rotate.

Specifically, the drive component 1600 may correspond to the rotary arm 1300 one by one. In the case that the head-mounted device comprises one rotary arm 1300, one drive component 1600 for driving the rotary arm 1300 to rotate may be provided on the bracket 1200. In the case that the head-mounted device comprises two rotary arms 1300, two drive components 1600 which are respectively configured to drive the corresponding rotary arm 1300 to rotate may be provided on the bracket 1200, and there are one-to-one correspondence between the two drive components 1600 and the two rotary arms 1300.

In an example, the drive component 1600 may include a DC stepper motor.

In an embodiment of the present disclosure, as shown in FIG. 1 and FIG. 2, the head-mounted device further comprises a position detection component 1700, which is provided on the bracket 1200, and can be configured to detect whether the rotary arm 1300 is rotated to the position where the position detection component 1700 is located.

As shown in FIG. 2, when the rotary arm 1300 is rotated to the position where the position detection component 1700 is located, the rotary arm 1300 can block the position detection component 1700; when the rotary arm 1300 has not been rotated to the position where the position detection component 1700 is located, the rotary arm 1300 cannot block the position detection component 1700, and thus the position detection component 1700 can detect whether the rotary arm 1300 is rotated to the position where the position detection component 1700 is located.

In an example, the position detection component 1700 may be a Hall sensor or an optical emission and reception module.

Specifically, when the head-mounted device plays audio through the bone conduction speaker 1400, in order to prevent from causing discomfort to the user who wears the earphone 1500, it is necessary to control the rotary arm 1300 to rotate to the position where the position detection component 1700 is located, so that the earphone 1500 is far away from the ear of the user wearing the head-mounted device. The position detection component 1700 in this embodiment can detect whether the rotary arm 1300 is rotated to the correct position.

In an embodiment of the present disclosure, as shown in FIG. 1 and FIG. 2, the bracket 1200 may comprise a hook 1210 for hanging on the user's ear. The bone conduction speaker 1400 may be provided at the end of the hook 1210.

In an embodiment of the present disclosure, as shown in FIG. 1 and FIG. 2, the head-mounted device may further comprise at least one microphone 1800, which can be provided on the bracket 1200 for collecting noise signals.

In an embodiment of the present disclosure, the head-mounted device may further comprise a processing module and a display module. At least part of the functional units of the processing module and the display module may be provided on the device body 1100.

Figure 3:
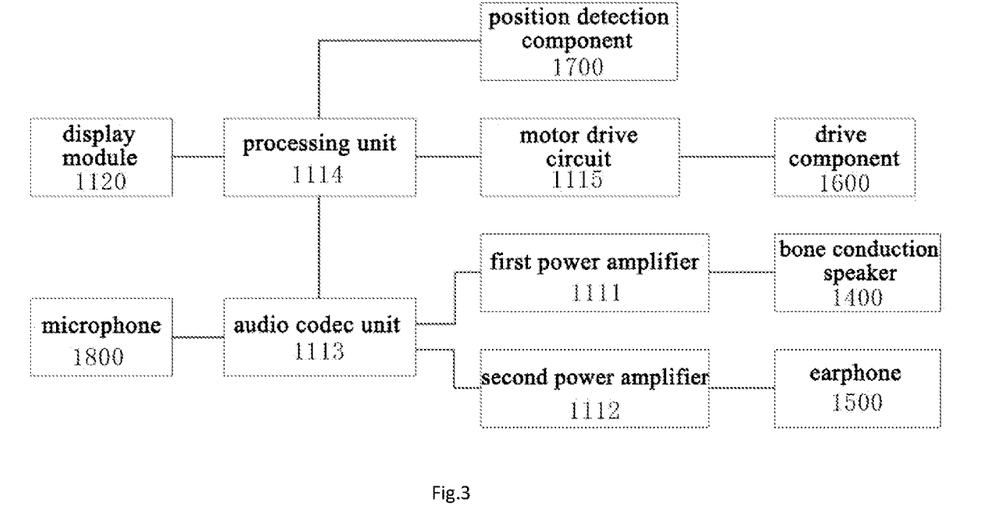
FIG. 3 is a schematic circuit diagram of a head-mounted device according to an embodiment of the present disclosure.

The schematic circuit diagram of the head-mounted device may be as shown in FIG. 3.

The processing module may comprise a first power amplifier 1111 corresponding to the bone conduction speaker 1400, a second power amplifier 1112 corresponding to the earphone 1500, an audio codec unit 1113, a processing unit 1114, and a motor drive circuit 1115.

The audio codec unit 1113 can encode and decode the noise signal collected by the microphone 1800 and the audio signal output by the processing unit 1114.

The first power amplifier 1111 can amplify the signal output by the audio codec unit 1113 and then transmit it to the bone conduction speaker 1400 for playback.

The second power amplifier 1112 can amplify the signal output by the audio codec unit 1113 and then transmit it to the earphone 1500 for playback.

The processing unit 1114 may determine the target audio mode of the head-mounted device according to the noise signal processed by the audio codec unit 1113, control the head-mounted device to switch from the current audio mode to the target audio mode, and output the audio signal according to the target audio mode.

In a first embodiment of the present disclosure, the way to control the head-mounted device to switch from the current audio mode to the target audio mode and output the audio signal according to the target audio mode may comprise:

the processing unit 1114 outputs a first control signal to the motor drive circuit 1115, the motor drive circuit 1115 drives the DC stepper motor according to the first control signal to rotate the rotary arm 1300 from the wearing position to the position where the position detection component 1700 is located; the processing unit 1114 controls the audio codec unit 1113 to stop transmitting the audio signal to the earphone 1500 through the second power amplifier 1112, and transmit the audio signal to the bone conduction speaker 1400 through the first power amplifier 1111 for playback.

In a second embodiment of the present disclosure, the way to control the head-mounted device to switch from the current audio mode to the target audio mode and output the audio signal according to the target audio mode may comprise:

the processing unit 1114 outputs a second control signal to the motor drive circuit 1115, the motor drive circuit 1115 drives the DC stepper motor according to the second control signal to rotate the rotary arm 1300 from the position where the position detection component 1700 is located to the wearing position, so that the earphone is located at the position corresponding to the user's ear; the processing unit 1114 controls the audio codec unit 1113 to stop transmitting the audio signal to the bone conduction speaker 1400 through the first power amplifier 1111, and transmit the audio signal to the earphone 1500 through the second power amplifier 1112 for playback.

In a third embodiment of the present disclosure, the way to control the head-mounted device to switch from the current audio mode to the target audio mode and output the audio signal according to the target audio mode may comprise:

the processing unit 1114 outputs the second control signal to the motor drive circuit 1115, the motor drive circuit 1115 drives the DC stepper motor according to the second control signal to rotate the rotary arm 1300 from the position where the position detection component 1700 is located to the wearing position, so that the earphone is located at the position corresponding to the user's ear; the processing unit 1114 controls the audio codec unit 1113 to stop transmitting the audio signal to the bone conduction speaker 1400 through the first power amplifier 1111, perform noise reduction processing on the audio signal according to the noise signal, and transmit the audio signal after noise reduction processed to the earphone 1500 through the second power amplifier 1112 for playback.

In a fourth embodiment of the present disclosure, the way to control the head-mounted device to switch from the current audio mode to the target audio mode and output the audio signal according to the target audio mode may comprise:

the processing unit 1114 controls the audio codec unit 1113 to perform noise reduction processing on the audio signal according to the noise signal, and transmits the audio signal after noise reduction processed to the earphone 1500 through the second power amplifier 1112 for playback.

In a fifth embodiment of the present disclosure, the way to control the head-mounted device to switch from the current audio mode to the target audio mode and output the audio signal according to the target audio mode may comprise:

the display module 1120 can be used to display the target audio mode for the user to view.

In an embodiment of the present disclosure, the head-mounted device may further comprise an interaction module. The interaction module can be used to realize the interaction between the user and the head-mounted device, so that the head-mounted device responds to the user's interaction behavior.

Specifically, the user can trigger a command of switching the audio mode through the interaction module, and the processing module can determine a new audio mode in response to the command, control the head-mounted device to switch from the target audio mode to the new audio mode, and output the audio signal according to the new audio mode. The mode of switching the audio mode by the processing module may refer to the above first to fifth embodiments, which will not be repeated here.

The interaction module may be provided by function keys, touch screen or microphone 1800. When the interaction module is provided by the touch screen, the display module may also be provided by the touch screen.

<Method>

In this embodiment, a control method of a head-mounted device is provided. The head-mounted device may be the head-mounted device described in the preceding embodiment.

Figure 4:
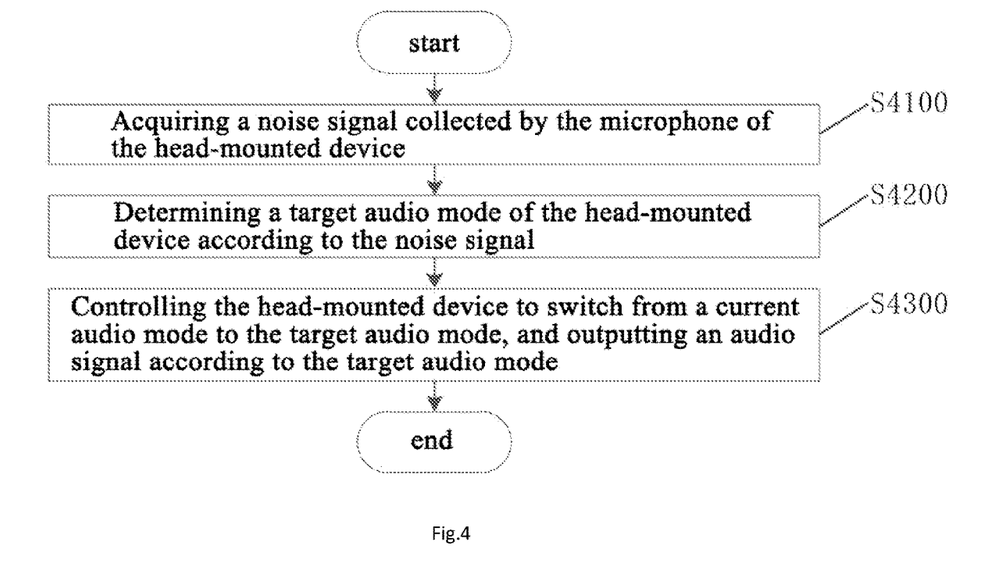
FIG. 4 is a flowchart of a control method of a head-mounted device according to an embodiment of the present disclosure.

FIG. 4 is a flowchart of a control method of a head-mounted device according to an embodiment of the present disclosure.

As shown in FIG. 4, the method comprises the following steps S4100 to S4300:

Step S4100, acquiring a noise signal collected by the microphone of the head-mounted device;

In this embodiment, the sound signal collected by the microphone may be used as the noise signal.

The microphone in this embodiment may be either a microphone array or a single microphone, which is not limited here.

Step S4200, determining a target audio mode of the head-mounted device according to the noise signal;

In an embodiment of the present disclosure, the step of determining a target audio mode of the head-mounted device according to the noise signal may comprise the following steps S4210 to S4230:

Step S4210, extracting a voice feature of the noise signal as a target voice feature;

In an embodiment of the present disclosure, the voice feature may include frequency components and/or the power spectral density.

Step S4220, comparing the target voice feature with pre-stored reference voice features to determine a reference voice feature matching with the target voice feature;

In an embodiment of the present disclosure, a variety of reference voice features may be stored in advance, for example, they may include voice features of noise emitted by subway, bus and other vehicles, voice features of wind, voice features of indoor noise, etc.

Step S4230, taking an audio mode corresponding to the reference voice feature matched with the target voice feature as the target audio mode.

In an embodiment of the present disclosure, each type of reference voice features corresponds to an audio mode. For example, the voice features of the noise emitted by a vehicle may correspond to a first audio mode, the voice features of wind may correspond to a second audio mode, and the voice features of indoor noise may correspond to a third audio mode.

Step S4300, controlling the head-mounted device to switch from a current audio mode to the target audio mode, and outputting an audio signal according to the target audio mode.

The current audio mode may be the audio mode of the head-mounted device before performing step S4300.

When the target audio mode is the first audio mode, it can be considered that the user is in a transportation tool such as on the subway or bus. In order to provide the user with high-fidelity audio and bring immersive experience to the user, it may be that the audio frequency signal after noise reduction processed is output through the earphone. In this case, the head-mounted device may be in the state as shown in FIG. 2.

When the target audio mode is the second audio mode, it can be considered that the user is in an outdoor environment. In order to ensure that the user can accurately perceive the sound in the environment to avoid accidents while listening to the audio, it may be that the audio signal is output through the bone conduction speaker. In this case, the head-mounted device may be in the state as shown in FIG. 1.

When the target audio mode is the third audio mode, it can be considered that the user is in a quiet indoor environment, and it may be that the audio signal without noise reduction is output through the earphone. In this case, the head-mounted device may be in the state as shown in FIG. 1.

In a first embodiment of the present disclosure, when the target audio mode is the second audio mode, and the current audio mode is the first audio mode or the third audio mode, the step of controlling the head-mounted device to switch from a current audio mode to the target audio mode, and outputting an audio signal according to the target audio mode may comprise:

controlling the rotary arm to rotate to the position where the position detection component 1700 is located; and controlling the head-mounted device to output the audio signal through the bone conduction speaker.

Specifically, it may be that the processing unit 1114 outputs a first control signal to the motor drive circuit 1115, and the motor drive circuit 1115 drives the DC stepper motor according to the first control signal to rotate the rotary arm 1300 from the wearing position to the position where the position detection component 1700 is located; the processing unit 1114 controls the audio codec unit 1113 to stop transmitting the audio signal to the earphone 1500 through the second power amplifier 1112, and transmit the audio signal to the bone conduction speaker 1400 through the first power amplifier 1111 for playback.

On the basis of this embodiment, it may be that when it is detected that the rotary arm 1300 is rotated to the position where the position detection component 1700 is located, the position detection component 1700 notifies the processing unit 1114, and when the processing unit 1114 receives the notification, it controls the audio codec unit 1113 to stop transmitting the audio signal to the earphone 1500 through the second power amplifier 1112, and transmit the audio signal to the bone conduction speaker 1400 through the first power amplifier 1111 for playback.

In a second embodiment of the present disclosure, when the target audio mode is the third audio mode and the current audio mode is the second audio mode, the step of controlling the head-mounted device to switch from a current audio mode to the target audio mode, and outputting an audio signal according to the target audio mode may comprise:

controlling the rotary arm to rotate from the position where the position detection component 1700 is located to the wearing position, so that the earphone is located at a position corresponding to the user's ear; and controlling the head-mounted device to output the audio signal through the earphone.

Specifically, it may be that the processing unit 1114 outputs a second control signal to the motor drive circuit 1115, the motor drive circuit 1115 drives the DC stepper motor according to the second control signal to rotate the rotary arm 1300 from the position where the position detection component 1700 is located to the wearing position, so that the earphone is located at the position corresponding to the user's ear; the processing unit 1114 controls the audio codec unit 1113 to stop transmitting the audio signal to the bone conduction speaker 1400 through the first power amplifier 1111, and transmit the audio signal to the earphone 1500 through the second power amplifier 1112 for playback.

In a third embodiment of the present disclosure, if the target audio mode is the first audio mode, the step of controlling the head-mounted device to switch from a current audio mode to the target audio mode, and outputting an audio signal according to the target audio mode may comprise:

controlling the rotary arm to rotate from the position where the position detection component 1700 is located to the wearing position, so that the earphone is located at a position corresponding to the user's ear;

performing noise reduction processing on the audio signal according to the noise signal; and controlling the head-mounted device to output the audio signal after noise reduction processed through the earphone.

Specifically, it may be that the processing unit 1114 outputs a second control signal to the motor drive circuit 1115, the motor drive circuit 1115 drives the DC stepper motor according to the second control signal to rotate the rotary arm 1300 from the position where the position detection component 1700 is located to the wearing position, so that the earphone is located at the position corresponding to the user's ear; the processing unit 1114 controls the audio codec unit 1113 to stop transmitting the audio signal to the bone conduction speaker 1400 through the first power amplifier 1111, perform noise reduction processing on the audio signal according to the noise signal, and transmit the audio signal after noise reduction processed to the earphone 1500 through the second power amplifier 1112 for playback.

In a fourth embodiment of the present disclosure, when the target audio mode is the third audio mode and the current audio mode is the first audio mode, the step of controlling the head-mounted device to switch from a current audio mode to the target audio mode, and outputting an audio signal according to the target audio mode may comprise:

performing noise reduction processing on the audio signal according to the noise signal; and controlling the head-mounted device to output the audio signal after noise reduction processed through the earphone.

Specifically, it may be that the processing unit 1114 controls the audio codec unit 1113 to perform noise reduction processing on the audio signal according to the noise signal, and transmit the audio signal after noise reduction processed to the earphone 1500 through the second power amplifier 1112 for playback.

In a fifth embodiment of the present disclosure, when the target audio mode is the first audio mode and the current audio mode is the third audio mode, the step of controlling the head-mounted device to switch from a current audio mode to the target audio mode, and outputting an audio signal according to the target audio mode may comprise:

stopping performing noise reduction processing on the audio signal; and controlling the head-mounted device to output the audio signal without noise reduction processing through the earphone.

Specifically, it may be that the processing unit 1114 controls the audio codec unit 1113 to stop performing noise reduction processing on the audio signal, and transmit the audio signal without noise reduction processing to the earphone 1500 through the second power amplifier 1112 for playback.

Through the embodiments of the present disclosure, the head-mounted device can adaptively switch to the target audio mode matching with the current scenario according to the ambient noise in the current scenario, and play the audio signal according to the target audio mode, which can improve the user experience.

In an embodiment of the present disclosure, the method may further comprise: displaying the target audio mode for users to view.

Through this embodiment, the user can know the actual audio mode of the head-mounted device.

In an embodiment of the present disclosure, the method may further comprise:

in response to a command input by a user to switch to a new audio mode, controlling the head-mounted device to switch from the target audio mode to the new audio mode, and outputting the audio signal according to the new audio mode.

The way of controlling the head-mounted device to switch from the target audio mode to a new audio mode, and outputting the audio signal according to the new audio mode can refer to the execution modes of step S4300 in the above first to fifth embodiments, which will not be repeated here.

Specifically, the user may input the command to switch to a new audio mode through the interaction module 1130.

Through this embodiment, users can also switch the audio mode of the head-mounted device according to their actual needs.

<Apparatus>

Figure 5:
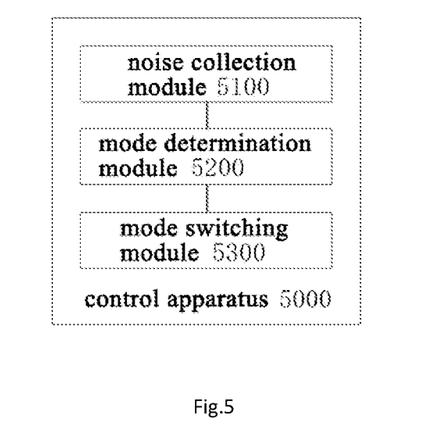
FIG. 5 is a schematic block diagram of a control apparatus of a head-mounted device according to an embodiment of the present disclosure.

In this embodiment, a control apparatus 5000 of a head-mounted device is provided, and the head-mounted device may be the head-mounted device described in the preceding embodiment. As shown in FIG. 5, the control apparatus 5000 may comprise: a noise collection module 5100, a mode determination module 5200, and a mode switching module 5300. The noise collection module 5100 is for acquiring a noise signal collected by the microphone of the head-mounted device. The mode determination module 5200 is for determining a target audio mode of the head-mounted device according to the noise signal. The mode switching module 5300 is for controlling the head-mounted device to switch from a current audio mode to the target audio mode, and outputting an audio signal according to the target audio mode.

In an embodiment of the present disclosure, the mode determination module 5200 may also be for:

extracting a voice feature of the noise signal as a target voice feature;

comparing the target voice feature with pre-stored reference voice features to determine a reference voice feature matching with the target voice feature; and     taking an audio mode corresponding to the reference voice feature matched with the target voice feature as the target audio mode.

In an embodiment of the present disclosure, the mode switching module 5300 may also be for:

controlling the rotary arm to rotate to a position where the position detection component is located; and     controlling the head-mounted device to output the audio signal through the bone conduction speaker.

In an embodiment of the present disclosure, the mode switching module 5300 may also be for:

controlling the rotary arm to rotate from a position where the position detection component is located to a wearing position, so that the earphone is located at a position corresponding to the user's ear; and     controlling the head-mounted device to output the audio signal through the earphone.

In an embodiment of the present disclosure, the mode switching module 5300 may also be for:

performing noise reduction processing on the audio signal according to the noise signal; and     controlling the head-mounted device to output the audio signal after noise reduction processed through the earphone.

In an embodiment of the present disclosure, the control apparatus 5000 may further comprise:

a module for, in response to a command input by a user to switch to a new audio mode, controlling the head-mounted device to switch from the target audio mode to the new audio mode, and outputting the audio signal according to the new audio mode.

Those skilled in the art will appreciate that the control apparatus 50000 may be implemented in many ways. For example, the control apparatus 5000 may be implemented by a processor configured by instructions. For example, the instructions may be stored in the ROM, and when the device is booted, the instructions are read from the ROM into the programmable device to implement the control apparatus 5000. For example, the control apparatus 5000 may be cured into a dedicated device (such as an ASIC). The control apparatus 5000 may be divided into independent units, or they may be implemented together. The control apparatus 5000 may be implemented by one of the various implementations described above, or may be implemented by a combination of two or more of the various implementations described above.

In this embodiment, the control apparatus 5000 can be implemented in many ways. For example, the control apparatus 5000 may be any software product or functional module running in an application that provides control services, or the peripheral inserts, plug-ins, patches, etc. of these software products or applications, or the software products or applications themselves.

<Control System of Head-Mounted Device>

In this embodiment, a control system 6000 for a head-mounted device is also provided.

Figure 6:
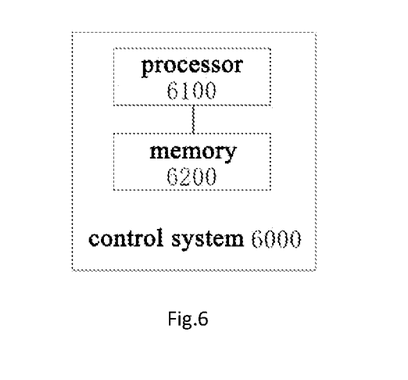
FIG. 6 is a schematic block diagram of a head-mounted device according to an embodiment of the present disclosure.

As shown in FIG. 6, the control system 6000 of the head-mounted device may comprise a processor 6100 and a memory 6200. The memory 6200 is configured to store an executable computer program. The computer program is configured to control the processor 6100 to execute the control method according to any embodiment of the present disclosure.

What is highlighted in each of the above embodiments is the difference between it and other embodiments, but it would be clear to those skilled in the art that the above embodiments can be used separately or in combination as required.

The embodiments in the present disclosure are described in a progressive manner. The same or similar parts of the embodiments may be referred by each other. Each embodiment focuses on the differences from other embodiments, but it would be clear to those skilled in the art that the above embodiments can be used separately or in combination as required. In addition, as for the device embodiments, since they correspond to the method embodiments, their description is relatively simple, and relevant parts may refer to the description of the method embodiments. The system embodiment described above is only schematic, and the modules described as separate components may or may not be physically separated.

The present disclosure may be a device, a method, a system and/or a computer program product. The computer program product may include a computer-readable storage medium loaded with computer-readable program instructions thereon for executing various aspects of the present disclosure.

The computer-readable storage medium may be a tangible device capable of holding and storing instructions used by the instruction executing device. The computer-readable storage medium may be, but not limited to, for example, electrical storage devices, magnetic storage devices, optical storage devices, electromagnetic storage devices, semiconductor storage devices or any random appropriate combinations thereof. More specific but non-exhaustive examples of the computer-readable storage medium include: portable computer disk, hard disk, random-access memory (RAM), read-only memory (ROM), erasable programmable read-only memory (EPROM or flash), static random access memory (SRAM), portable compact disk read-only memory (CD-ROM), digital versatile disk (DVD), memory stick, floppy disk, mechanical coding device, such as a punched card storing instructions or an emboss within a groove, and any suitable combinations thereof. The computer-readable storage medium used herein is not interpreted as a transient signal itself such as radio wave or other freely propagated electromagnetic wave, electromagnetic wave propagated through waveguide or other transmission medium (such as optical pulses passing through fiber-optic cables), or electric signals transmitted through electric wires.

The computer-readable program instructions described herein may be downloaded from the computer-readable storage medium to various computing/processing devices, or to external computers or external storage devices via a network such as the Internet, local area network, wide area network and/or wireless network. The network may comprise copper transmission cables, optical fiber transmission, wireless transmission, routers, firewalls, switches, gateway computers and/or edge servers. The network adapter or network interface in each computing/processing device receives computer-readable program instructions from the network, and forwards the computer-readable program instructions for storage in the computer-readable storage medium of each computing/processing device.

The computer program instructions for executing the operations of the present disclosure may be assembly instructions, instructions of instruction set architecture (ISA), machine instructions, machine-related instructions, microcode, firmware instructions, state setting data, or a source code or target code written by any combinations of one or more programming languages. the programming languages include object-oriented programming languages, such as Smalltalk, C++, and conventional procedural programming languages, such as "C" language or similar programming languages. The computer-readable program instructions may be completely or partially executed on the user computer, or executed as an independent software package, or executed partially on the user computer and partially on the remote computer, or completely executed on the remote computer or the server. In the case where a remote computer is involved, the remote computer may be connected to the user computer by any type of networks, including local area network (LAN) or wide area network (WAN), or connected to an external computer (such as via the Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA) for example. The electronic circuit may execute computer-readable program instructions to implement various aspects of the present disclosure.

Various aspects of the present disclosure are described herein with reference to the flow chart and/or block diagram of the method, device (system) and computer program product according to the embodiments of the present disclosure. It should be understood that each block in the flow chart and/or block diagram and any combinations of various blocks thereof may be implemented by the computer-readable program instructions.

The computer-readable program instructions may be provided to the processing unit of a general purpose computer, a dedicated computer or other programmable data processing devices to generate a machine, causing the instructions, when executed by the processing unit of the computer or other programmable data processing devices, to generate a device for implementing the functions/actions specified in one or more blocks of the flow chart and/or block diagram. The computer-readable program instructions may also be stored in the computer-readable storage medium. These instructions enable the computer, the programmable data processing device and/or other devices to operate in a particular way, such that the computer-readable medium storing instructions may comprise a manufactured article that includes instructions for implementing various aspects of the functions/actions specified in one or more blocks of the flow chart and/or block diagram.

The computer-readable program instructions may also be loaded into computers, other programmable data processing devices or other devices, so as to execute a series of operational steps on the computers, other programmable data processing devices or other devices to generate a computer implemented process. Therefore, the instructions executed on the computers, other programmable data processing devices or other devices may realize the functions/actions specified in one or more blocks of the flow chart and/or block diagram.

The accompanying flow chart and block diagram present possible architecture, functions and operations realized by the system, method and computer program product according to the embodiments of the present disclosure. At this point, each block in the flow chart or block diagram can represent a module, a program segment, or a portion of the instruction. The module, the program segment or the portion of the instruction includes one or more executable instructions for implementing specified logic functions. In some alternative implementations, the function indicated in the block can also occur in an order different from the one represented in the drawings. For example, two consecutive blocks actually can be executed in parallel, and sometimes they may also be executed in a reverse order depending on the involved functions. It should also be noted that each block in the block diagram and/or flow chart, and any combinations of the blocks thereof can be implemented by a dedicated hardware based system for implementing specified functions or actions, or a combination of the dedicated hardware and the computer instructions. It is well known to those skilled in the art that implementation by hardware, implementation by software, and implementation by a combination of software and hardware are all equivalent.

The embodiments of the present disclosure have been described above in an illustrative and non-exhaustive manner. The present disclosure is not limited to the embodiments disclosed herein. Various modifications and changes will be apparent to those skilled in the art without departing from the scope of the embodiments. The choice of terms used herein is intended to best explain the principles, practical applications, or technical improvements of the embodiments, or to enable other skilled persons in the art to understand the embodiments disclosed herein. The scope of the present disclosure is defined by the appended claims.

The embodiments in the present disclosure are described in a progressive manner. Each embodiment focuses on the differences from other embodiments, and the same or similar parts of the embodiments may be referred by each other. As for the device embodiments, since they correspond to the method embodiments, their description is relatively simple, and relevant parts may refer to the description of the method embodiments.

It should also be noted that, relational terms such as first and second used herein are only to distinguish one entity or operation from another, and do not necessarily require or imply that there is such actual relationship or order among those entities or operations. Moreover, the terms "comprise", "include" or any other variants are intended to cover non-exclusive inclusion, so that the process, method, article or apparatus including a series of elements may not only include those elements, but may also include other elements not stated explicitly, or elements inherent to the process, method, articles or apparatus. Without more limitations, an element defined by the phrase "comprising a . . . " does not exclude the case that there are other same elements in the process, method, article or apparatus including the element.

The above description of the disclosed embodiments enables those skilled in the art to implement or use the present disclosure. Various modifications to these embodiments will be apparent to those skilled in the art. The general principles defined herein may be implemented in other embodiments without departing from the spirit or scope of the present disclosure. Therefore, the present disclosure will not be limited to the embodiments shown herein, but will conform to the broadest scope consistent with the principles and novel features disclosed herein.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A control method of a head-mounted device, wherein the head-mounted device comprising: a device body, a bracket connected with the device body, and at least one rotary arm;
wherein the bracket is used to wear the head-mounted device on a user's head;
the bracket is provided thereon with a bone conduction speaker;
one end of the rotary arm is rotationally connected to the bracket, and the other end of the rotary arm is provided with an earphone;
the head-mounted device further comprises a position detection component, the position detection component provided on the bracket and configured to detect whether the rotary arm is rotated to the position where the position detection component is located;
the head-mounted device comprises a microphone,
the method comprises the following steps:
acquiring a noise signal collected by the microphone of the head-mounted device;
determining a target audio mode of the head-mounted device according to the noise signal; and
controlling the head-mounted device to switch from a current audio mode to the target audio mode, and outputting an audio signal according to the target audio mode,
the step of outputting an audio signal according to the target audio mode comprises:
controlling the rotary arm to rotate to a position where the position detection component is located; and controlling the head-mounted device to output the audio signal through the bone conduction speaker,
or
controlling the rotary arm to rotate from a position where the position detection component is located to a wearing position, so that the earphone is located at a position corresponding to the user's ear; and controlling the head-mounted device to output the audio signal through the earphone.

2. The method according to claim 1, wherein the step of determining a target audio mode of the head-mounted device according to the noise signal comprises:
extracting a voice feature of the noise signal as a target voice feature;
comparing the target voice feature with pre-stored reference voice features to determine a reference voice feature matching with the target voice feature; and
taking an audio mode corresponding to the reference voice feature matched with the target voice feature as the target audio mode.

3. The method according to claim 1, wherein the step of controlling the head-mounted device to output the audio signal through the earphone comprises:
performing noise reduction processing on the audio signal according to the noise signal; and
controlling the head-mounted device to output the audio signal after noise reduction processed through the earphone.

4. A control system of a head-mounted device, comprising:
a processor; and
a memory configured to store an executable computer program which is configured to control the processor to execute the method according to claim 1.

5. The control system of a head-mounted device according to claim 4, wherein the step of determining a target audio mode of the head-mounted device according to the noise signal comprises:
extracting a voice feature of the noise signal as a target voice feature;
comparing the target voice feature with pre-stored reference voice features to determine a reference voice feature matching with the target voice feature; and
taking an audio mode corresponding to the reference voice feature matched with the target voice feature as the target audio mode.

6. The control system of a head-mounted device according to claim 4, wherein the step of controlling the head-mounted device to output the audio signal through the earphone comprises:
performing noise reduction processing on the audio signal according to the noise signal; and
controlling the head-mounted device to output the audio signal after noise reduction processed through the earphone.

7. A control apparatus of a head-mounted device, wherein the head-mounted device; a device body, a bracket connected with the device body, and at least one rotary arm;
the bracket is used to wear the head-mounted device on a user's head;
the bracket is provided thereon with a bone conduction speaker;
one end of the rotary arm is rotationally connected to the bracket, and the other end of the rotary arm is provided with an earphone;
the head-mounted device further comprises a position detection component, the position detection component provided on the bracket and configured to detect whether the rotary arm is rotated to the position where the position detection component is located;
the head-mounted device further comprises a microphone,
the apparatus comprises:
a noise collection module configured to acquire a noise signal collected by the microphone of the head-mounted device;
a mode determination module configured to determine a target audio mode of the head-mounted device according to the noise signal; and
a mode switching module configured to control the head-mounted device to switch from a current audio mode to the target audio mode, and output an audio signal according to the target audio mode,
outputting an audio signal according to the target audio mode comprises:
controlling the rotary arm to rotate to a position where the position detection component is located; and controlling the head-mounted device to output the audio signal through the bone conduction speaker,
or
controlling the rotary arm to rotate from a position where the position detection component is located to a wearing position, so that the earphone is located at a position corresponding to the user's ear; and controlling the head-mounted device to output the audio signal through the earphone.

\* \* \* \* \*